United States Patent

Campanella

[15] 3,646,558
[45] Feb. 29, 1972

[54] PHASED ARRAY BEAM STEERING CONTROL WITH PHASE MISALIGNMENT CORRECTION

[72] Inventor: Matthew J. Campanella, Hammonton, N.J.

[73] Assignee: The United States of America as represented by the Secretary of the Navy

[22] Filed: Feb. 20, 1970

[21] Appl. No.: 18,029

[52] U.S. Cl. ...................................343/100 SA, 343/854
[51] Int. Cl. ..................................................H04b 7/08
[58] Field of Search .....................343/854, 100 R, 100 SA

[56] References Cited

UNITED STATES PATENTS

| | | | |
|---|---|---|---|
| 3,324,452 | 6/1967 | Brightman et al. | 343/100 SA |
| 3,482,244 | 12/1969 | Gadenne | 343/100 SA |
| 3,478,358 | 11/1969 | Trigon | 343/100 SA |

*Primary Examiner*—Carl D. Quarforth
*Assistant Examiner*—J. M. Potenza
*Attorney*—R. S. Sciascia and Thomas O. Watson, Jr.

[57] ABSTRACT

A system for remotely controlling the phase of active antenna elements in a phased array that has the capability of correcting the inherent phase misalignment of each individual antenna element within the array. Beam azimuth and elevation signals are fed into an appropriate arithmetic unit by a radar signal processor. Roll, yaw and pitch signals are fed into the same arithmetic unit by an inertial navigation system. The arithmetic unit, using the information from the inertial navigation system and the radar signal processor, computes the phase shift required for each individual antenna element in order to point the radar beam in the desired direction. To compensate for inherent phase alignment in the system, an antennule position and alignment store feeds a predetermined alignment factor for each antennule into the arithmetic unit. The arithmetic unit then adds or subtracts the alignment factors from the respective computed phase angles. All the calculated phase angles are then sent to the control circuitry of the antenna array. A $Csc^2$ beam phase shift store provides for generation of a $Csc^2$ beam at the array.

7 Claims, 7 Drawing Figures

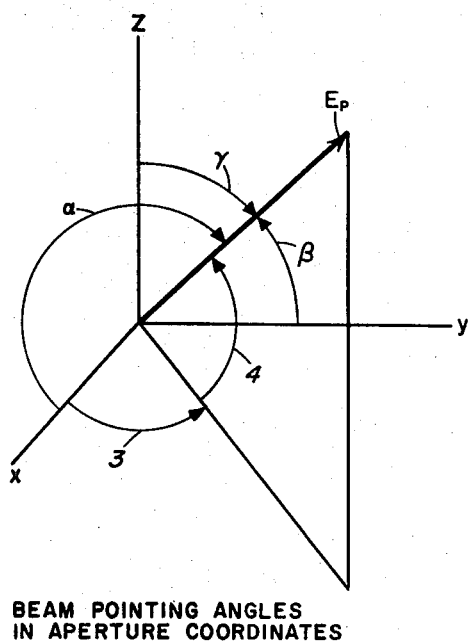
BEAM POINTING ANGLES
IN APERTURE COORDINATES
FIG. 1
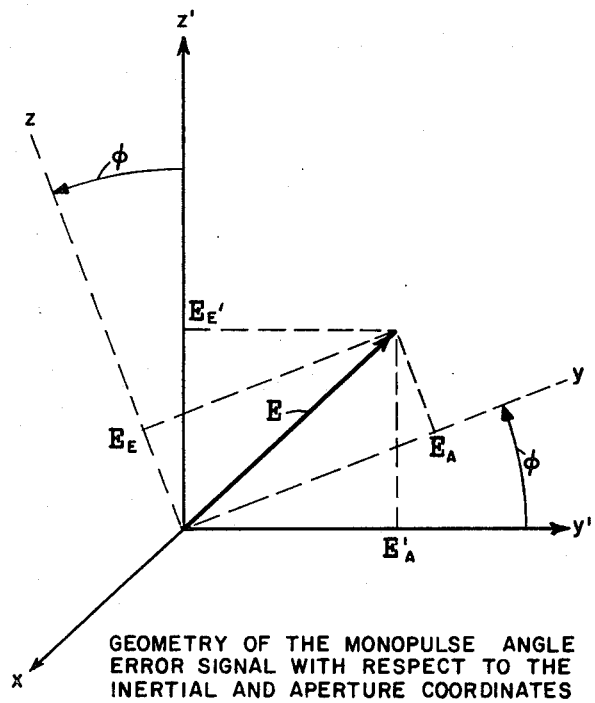
GEOMETRY OF THE MONOPULSE ANGLE
ERROR SIGNAL WITH RESPECT TO THE
INERTIAL AND APERTURE COORDINATES
FIG. 2
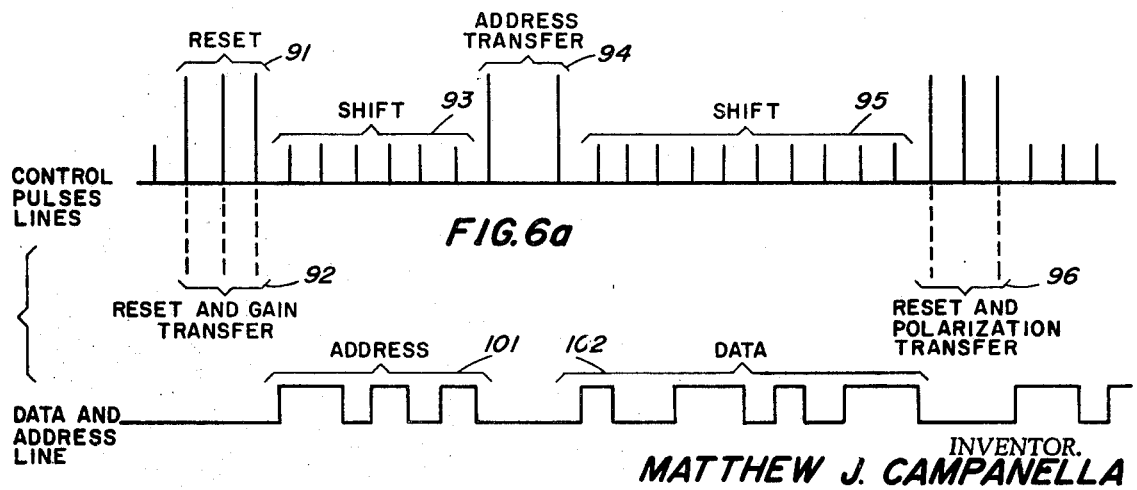
FIG. 6a
FIG. 6b
INVENTOR.
MATTHEW J. CAMPANELLA

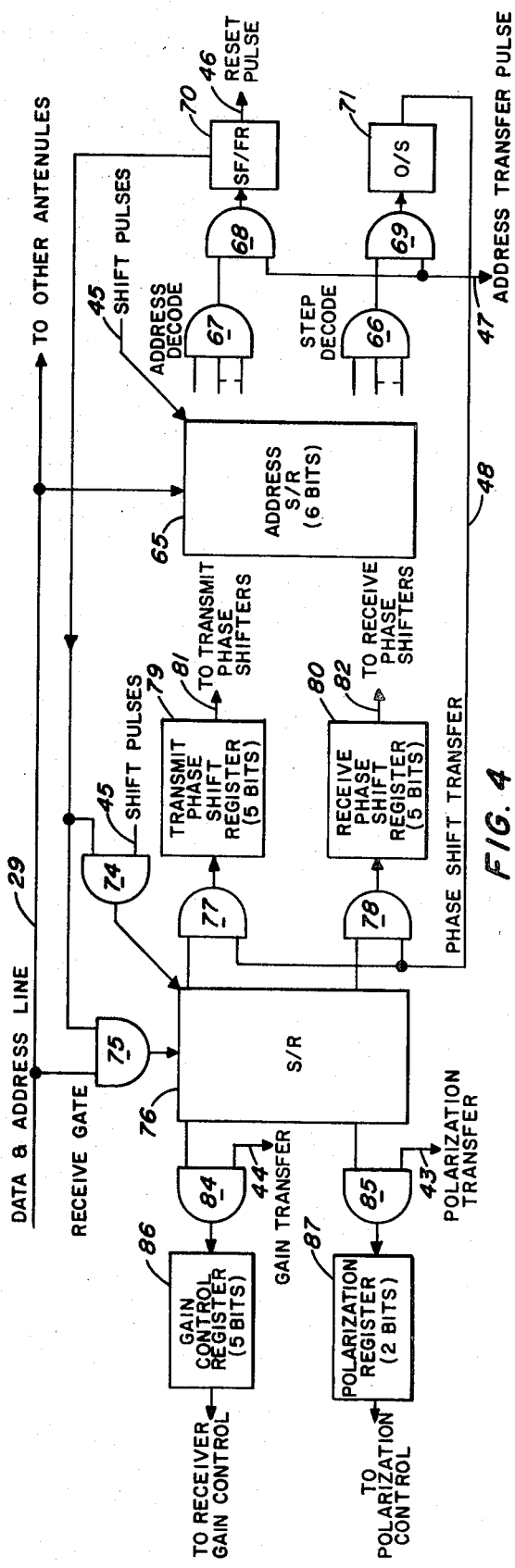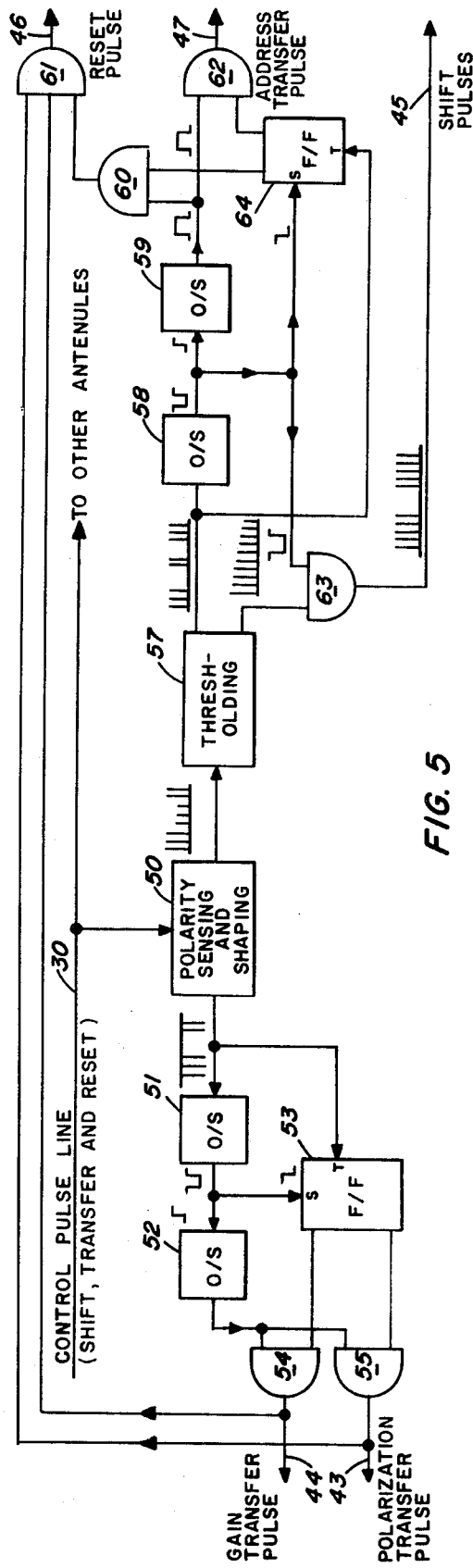

PHASED ARRAY BEAM STEERING CONTROL WITH PHASE MISALIGNMENT CORRECTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention pertains to radar antenna systems and more specifically to microwave energy radar antenna systems of the phased array type. VHF or lower UHF antenna arrays for radar systems are well known in the art. By applying a predetermined relative amplitude and phase to the signal applied to each of the antenna elements within the array, the desired radiation pattern can be obtained from the combined action of all the elements. The relative phases of the signals received by the antenna elements within the array determine the position of the main beam. If the relative phases do not vary, the entire radiation pattern is fixed. If steering of the beam is desired, varying the phase relationship between the elements of the array will vary the position of the main beam.

A two-dimensional planar array of antenna elements has been found to be one of the most versatile antenna arrays available since it is possible to cause such an array to generate a variety of beams by varying the phase relationship between the individual antenna elements of the array. The beams generated by a two-dimensional planar array may be scanned by applying to each element the necessary phase shift required to position the beam in the desired direction at each point in time. An independently controlled phase shifter is attached to each element to provide the proper phase shift. These phase shifters may be controlled separately or by groups, such as controlling the rows and columns of the array in groups, which is called parallel-parallel control.

One of the major drawbacks in a phased antenna array is the difficulty of maintaining phase stability under less than laboratory conditions. Since the system itself will introduce phase changes, it becomes necessary that the phase changes introduced by the transmission lines, amplifiers, mixers and other components in the array be constant and negligibly small. In order to achieve this ideal, the environment within which the radar operates must be maintained at constant conditions and the voltages applied to the amplifiers must not vary.

Several approaches have been tried to get satisfactory operation in less than ideal conditions. One approach has been the use of a servo-controlled loop to maintain constant the phase shift through the major networks of the array. Another method would be to provide a vernier phase shifter in the signal path of each antenna element and have each vernier individually set during the alignment procedures of the array. The servo-loop system previously mentioned is very complex, expensive and difficult to maintain whereas the use of vernier phase shifters complicates the active antenna element electronics. Use of vernier phase shifters presents a physical problem of where to locate the alignment control since there is not much room on the element itself for mounting controls that are easily accessible when the antennule is in place in the array.

SUMMARY OF THE INVENTION

The instant invention resolves the inherent phase misalignment problem economically and with the least amount of complexity. In an electronically scanned phased antenna array, the required respective phase shifts are stored in an antennule position and alignment store and are fed to a central arithmetic unit when required. The central arithmetic unit receives desired azimuth and elevation data from a radar signal processor. The arithmetic unit, using the roll, pitch and yaw information from an inertial navigation system, and antennule coordinates obtained from the antennule position and alignment store, computes the phase shift required for the respective antennule to point the beam in the desired direction. It then compensates the computed phase shift for the inherent phase misalignment of each antennule system. After being so computed and compensated, the phase shifts are sent to the antennules via fan out and driver circuits. To route the correct phase shift to each antennule, an antennule address is associated with each computed phase shift and both are sent out serially over data and address signal lines to the addressed antennule. If the particular antennule is being addressed, it is recognized by an address decode gate. When this gate is activated, it will cause the phase shift information which follows the address information on the signal line to be entered into the receiving shift register of the addressed antennule. In normal operation, all the antennules of an array are loaded in sequence. When they have all been loaded, an address code, to which all the antennules respond is sent out by the arithmetic unit. Upon receipt of this code, all the phase shifts are simultaneously transferred from the respective receiving shift registers to the respective phase shift registers. The latter register drives the phase shifter in the antennule. Therefore, it can be seen that by adding or subtracting the respective phase shift required to correct for the inherent phase misalignment of each antennule system in the central arithmetic unit before the phase shift is distributed to the various antennules, a vernier phase shift control on the antennule proper is not necessary and the whole system is simplified and more reliable.

OBJECTS OF THE INVENTION

An object of this invention is to provide phase shift beam steering control for an antenna array that automatically corrects for inherent phase misalignments.

A further object of this invention is to provide phase shift beam-steering control for an antenna array that automatically corrects for inherent phase misalignments and is compatible with roll, pitch and yaw stabilization of the entire array.

A still further object of this invention is to provide phase shift beam-steering control for a planar antenna array that automatically corrects for inherent phase misalignments and is compatible with generation of a diversity of beam patterns.

Another object of this invention is to provide phase shift beam-steering control for a planar antenna array that facilitates beam scanning and automatically corrects for inherent phase misalignments as the individual array elements are phase shifted.

Yet another object of this invention is to provide phase shift beam-steering control for a planar antenna array that facilitates beam scanning and automatically corrects for inherent phase misalignments as the individual array elements are individually phase shifted.

Another object of this invention is to provide phase shift beam-steering control for a corporate fed, active aperture planar antenna array that facilitates beam scanning and automatically corrects for inherent phase misalignments as the individual array elements are individually phase shifted.

Other objects, advantages and novel features of the invention will become apparent from the following detailed description of the invention when considered in conjunction with the accompanying drawings.

BRIEF DESCRIPTION OF THE DRAWINGS

FIG. 1 is a vector illustration of the beam pointing vector and the angles that are utilized in computing its direction;

FIG. 2 is a vector illustration of the angular error created by the rolling motion of the antenna structure;

FIG. 4 is a diagram partially in block and partially in schematic form which illustrates the data-receiving and implementation control circuitry of each antenna in the array;

FIG. 5 is a diagram partially in block and partially in schematic form which illustrates the control signal receiving and implementation control circuitry of each antennule in the array;

FIG. 6a illustrates the type of control pulses sent to the control circuits of the antennules; and FIG. 6b illustrates the data and address pulses sent to the information circuits of the antennules.

DETAILED DESCRIPTION OF THE PREFERRED EMBODIMENTS

Figure 3:
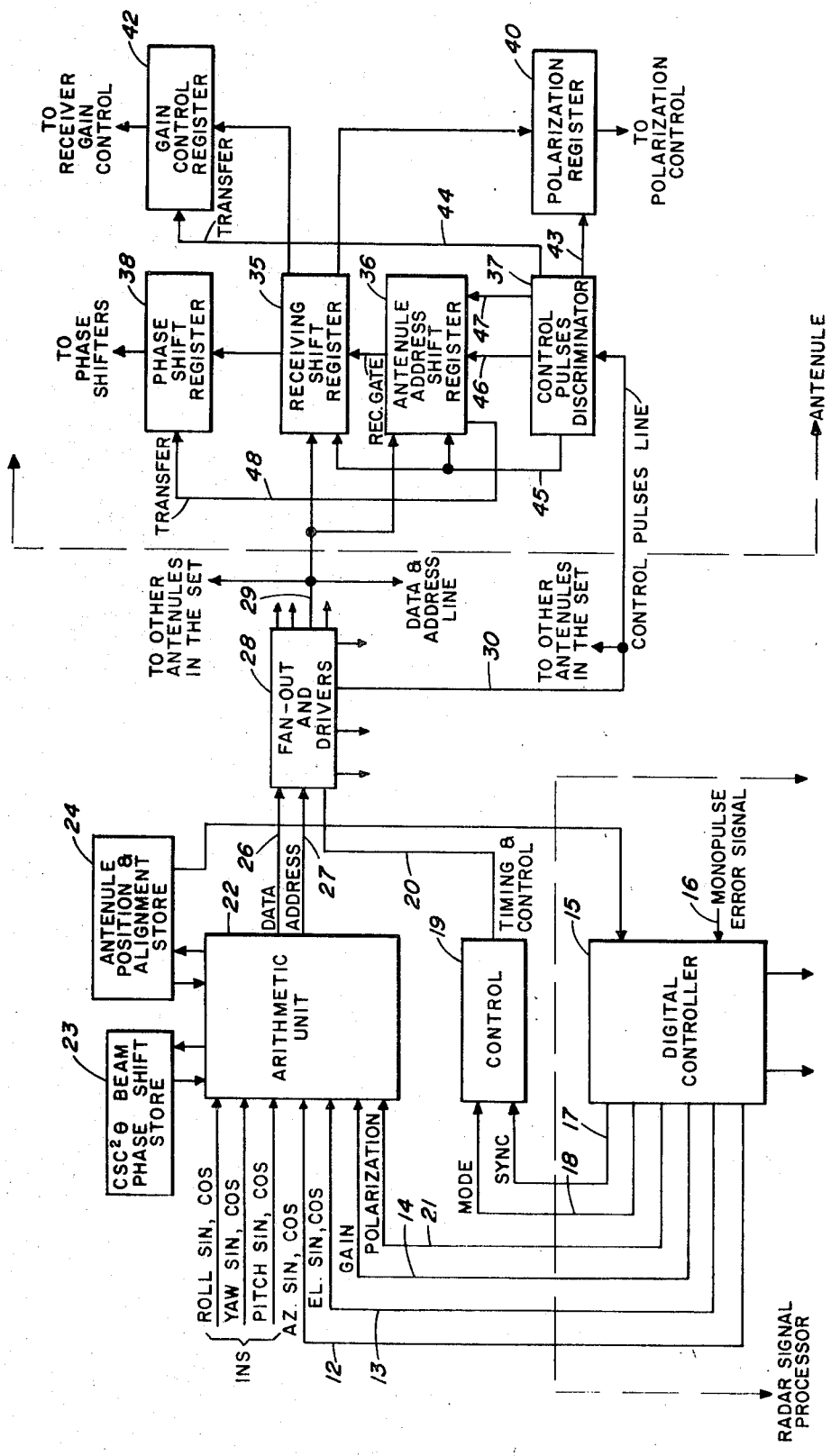
FIG. 3 is a block diagram of the overall phased array beam pointing and scanning system.

The phase shift beam-steering control function and embodiment of the instant invention will be illustrated in a corporate-fed, active aperture, antenna array. A corporate-fed array, as is well known in the art, implies that the distribution of microwave energy to the array elements is by shielded transmission lines which have equal length paths from the input port to all the elements of the array. An active aperture antenna (antennule) array, as is well known in the art, implies that the individual array elements contain active devices for generating or amplifying microwave energy. Choice of a corporate-fed, active aperture, array does not preclude the use of other forms of arrays such as the space-fed type using a refractive lens array or a reflective array, either with active antenna elements or passive antenna elements. The planar, active aperture corporate fed, antenna array, contemplated for use with the present invention is capable of generating the two basic beam shapes required for all radar modes, the $Csc^2\theta Cos^{1/2}\theta$ beam which is used for mapping modes, and the pencil beam which is used for all other modes.

Use of a trihex antennule as the antenna element is contemplated with this invention. The trihex antennule comprises three hexagonal elements grouped together to form a linear trihex package. A hexagonal element was selected to obtain maximum radiation area and to maintain the desired center-to-center spacing between the antennules. The grouping together of three hexagonal-shaped antenna elements into a linear trihex package results in a reduction of the number of connectors that are required to connect the antennules to the beam-steering control circuitry. The present invention functions equally effectively with any other antennule arrangement.

A phased antenna array such as described above requires beam-steering and control systems to direct and control the radiated beam formed by the array. Since an array involves hundreds and perhaps even thousands of individual radiating elements whose individual phases must be controlled, the problem of controlling the beam quickly takes on gigantic proportions. This is particularly true in an airborne environment where weight and space limitations further complicate the problem.

The direction and pointing control of the beam is based on the fact that the far field radiation pattern can be determined by use of the fourier transform of the excitation in the antenna aperture:

$$\vec{E}_p = \int_s |\vec{I}(y,z)| \, e^{-j2\pi \left[\phi(y,z) - \frac{\cos \beta}{\lambda} y - \frac{\cos \gamma}{\lambda} z\right]} dy dz \quad (1)$$

where:

$|\vec{I}(y,z)|$ = vector amplitude of the excitation across the aperture $\Phi(y,z)$ = phase of excitation across the aperture (in units of $2\pi$)

$\gamma$ = radiating wave length $\cos\beta$, $\cos\gamma$ = direction cosines of beam direction $y, z$ = aperture coordinates of radiating elements The main beam of the array is formed in the direction determined by $\cos\beta$ and $\cos\gamma$ which makes the exponential factor of the integral above Equation 1 go to zero. This leads to the basic pointing equation:

$$\phi(y,z) = \left(\frac{\cos \beta}{\lambda}\right) y + \left(\frac{\cos \gamma}{\lambda}\right) z \quad (2)$$

This equation gives the phase of each radiating element in the array for the desired pointing direction. The equation needs to be solved for each antennule every time the beam is repositioned.

Two possible methods for stabilizing the antenna beam in space may be used, the electronic and the electromechanical. The electromechanical method introduces certain distinct disadvantages in that the antenna aperture, along with most of its supporting electronics, must be free to rotate. Electronic stabilization on the other hand requires less space and is appreciably lighter along with the additional factor of having higher reliability. Computations required to keep the radiated beam fixed in space as an aircraft, for example, rotates are basically those of a three-dimensional angular coordinates conversion. The functional relationships between the aircraft angular motion and beam pointing angles, in aperture coordinates, are given by:

$\cos \beta = \sin \theta \sin \phi \cos E [\cos \psi \cos A + \sin \psi \sin A]$
$+ \cos \phi \cos E [\cos \psi \cos A - \sin \psi \cos A]$
$+ \cos \theta \sin \phi \sin E$ (Eq. 3a)
$\cos \gamma = \sin \theta \cos \phi \cos E [\cos \psi \cos A + \sin \psi \sin A]$
$+ \sin \phi \cos E [\sin \psi \cos A - \cos \psi \sin A]$
$+ \cos \phi \cos \theta \sin E$ (Eq. 3b)

where:

$\beta, \gamma$ = beam pointing direction angles in aperture coordinates
$\psi$ = yaw angle
$\theta$ = pitch angle
$\phi$ = roll angle
$A$ = azimuth position of beam in inertial reference frame
$E$ = elevation position of beam in inertial reference frame The functional relationship between the aircraft motion and the beam-pointing angles in aperture coordinates can be seen by looking at FIG. 1 where the $y$—$z$ plane is the plane of the aperture. The X axis is therefore the broadside direction. Angles $\alpha$, $\beta$ and $\gamma$ are the direction angles of the beam-pointing vector $E_p$. Angle 3 is the azimuth angle and angle 4 is the elevation angle of the beam-pointing vector.

Equations 3a and 3b give the beam-pointing direction in aperture coordinates for any desired azimuth and elevation position in inertial coordinates. The angles calculated are carried through and utilized by the beam-pointing control system of the invention as direction cosines rather than radian measures, since that is the way they appear in the equation for the antennule phase shift; this simplifies the computations required.

If the antenna aperture is not roll gimbal stabilized then the azimuth and elevation error signals do not form a tracking mode with respect to the inertial coordinate system but rather with respect to the aperture (vehicle) coordinate system. Conceivably the tracking loops could be arranged to be executed in aperture coordinates. But, an inverse computation would have to be implemented as part of this approach in which the inertial position of the beam is computed from its direction cosine in aperture coordinates. The equations involved are the inverses of equations 3a and 3b. Since the solution of these equations have to be implemented for regular positioning of the beam in standing modes, it would be advantageous if they could be used again for monopulse tracking and thereby avoid implementing their inverses.

This can be done by initially converting the monopulse error signals to inertial coordinates, using a simpler computation, and performing tracking in inertial coordinates. FIG. 2 shows the geometry of the monopulse angle error signal with respect to the inertial and aperture coordinates. From this figure it is readily seen that:

$\epsilon'_E = \epsilon E \cos \phi \pm \epsilon A \sin \phi$ (Eq. 4a)
$\epsilon'_A = \epsilon E \sin \phi + \epsilon A \cos \phi$ (Eq. 4b)

where:

$\epsilon$ = angular error
$\epsilon E$ = elevation error ⎫
$\epsilon A$ = azimuth error ⎬ aperture coordinates $\epsilon'E$ = elevation error $\Big\}$ inertial coordinates
$\epsilon'A$ = azimuth error
$\phi$ = roll angle The error signals given by the above two angular error equations 4a and 4b are applied to the initial azimuth and elevation beam pointing control circuits so as to reposition the beam and drive it to zero, but at the same time retain the beam position in inertial coordinates without further computations.

An appropriate phase angle, previously determined, is added to each antennule to obtain a $\csc^2\theta$ beam pattern. These phase shifts are in addition to those required to point the beam in a given direction. Phase shift values will be predetermined in the computer rather than repeatedly calculating them by use of some form of curve. In the equation used, the symetry of the phases required to obtain the $\csc^2\theta$ beam is such that the phase shifts are the same per each row of antennules in the array. Consequently, a different phase shift is only required for each row, which considerably reduces the storage requirement.

In addition to pointing the beam, it is sometimes desired that the beam-pointing control system be used for remotely controlling the polarization of the radiated signal and the receiving gain of the antennule aperture. Signals for both of these functions would be sent at the beginning of an operating mode and need not be repeatedly updated every time the beam is stepped. But, provision must be made in a central unit for generating it and in the antennule for receiving and holding this control information. Two bits of storage are required in the antennule for controlling the polarization state. Four polarization states exist, vertical, horizontal, left circular and right circular.

Control of the antennule-receiving gain is used to obtain signal shading across the aperture. The gain is varied as a function of radial distance from the aperture origin with a functional relationship of the form $\cos^2 X$.

Another requirement of the beam-pointing control circuitry is that of providing means for correcting the inherent phase misalignment of the antennules in the aperture. This basically amounts to adding an additional phase shift to the beam-pointing phase shift to compensate for the fact that the azimuth signal path through the manifold varies slightly from antennule to antennule. The amount of phase shift to be added, which is stored within the beam-pointing control circuitry, is experimently determined for each antennule during alignment of the radar beam.

The foregoing discussion of the basic mathematical and logic manipulations necessary to accomplish the function of a phased array beam-steering control system will now be implemented by reference to a specific organization of the above-mentioned mathematical and logic manipulations to accomplish a contemplated embodiment of a phased array beam-steering control system which will control the phase shift of the antennules within the array and thereby control the direction of the beam.

Referring to FIG. 3, the functional blocks to the right of the dashed-line labeled antennule show the functions contained in a typical antennule of which there would be hundreds or perhaps even thousands in one array. The functional blocks on the left side of the dashed line labeled antennule show those functions that are performed for many or all of the antennules by centralized circuitry.

The signals indicating the direction in which it is desired to point the beam, originate in digital controller 15 of FIG. 3 which is part of a standard radar signal processor. A radar application is used for illustrative purposes because this is a primary application of phased array antennas. The beam direction indicating signal is sent by digital controller 15 over lines 12 and 13 to arithmetic unit 22. The beam direction indicating signal is in the form of sines and cosines of the desired azimuth and elevation angles. This form of the signal is chosen for convenience to save computation time in arithmetic unit 22. Had the digital controller output been in terms of the angle directly in degrees of radian measure, arithmetic unit 22 would have to convert them into sines and cosines since that is the functional form which enters into the beam-pointing equations, previously noted.

The pointing angle designated by digital control 15 is in inertial coordinates. When the antenna array is movable and unstabilized these inertial angles have to be converted to angles using the antenna planes as a reference. A coordinate conversion using roll, yaw and pitch angles from an inertial navigation system, not shown, is performed in arithmetic unit 22. The inertial angles of azimuth and elevation from the digital controller are converted to angles with respect to the antenna plane. The specific mathematical equations 3a and 3b, to accomplish this function were mentioned above.

Having established the pointing angles with respect to the array plane, in aperture coordinates, the next operation in arithmetic unit 22 involves determining the phase shift required for each antennule to obtain the desired pointing angle of the beam. The basic beam-pointing equation, Equation 2, is used to compute the required phase shift for each antennule. The coordinates of each antennule in the array are stored in antennule position and alignment store 24 from which they are retrieved in sequence. These coordinates address the calculated phase shifts.

Antennule position and alignment store also provides the alignment phase shift required to compensate for phase shifts introduced by the various radiofrequency paths. As far as the radiation field of the array is concerned, it makes no difference whether the phase shift of a specific antennule is caused by a difference in the azimuth path lengths or by a calculated phase shifting in the phase shifter. If the deviations of the radiofrequency path length with respect to a nominal value is determined by experimentation for a particular antennule, this value can then be added or subtracted from every phase shift computed for that particular antennule. This would automatically, thereby, eliminate the path phase shift error. The experimentally determined phase shifts are stored in antennule position and alignment store 24 with the associated coordinate positions. When a phase shift for an antennule at a particular array position is computed, the associated phase shift error is simply added or subtracted therefrom.

The phase shifts for all the antennules are computed in sequence in arithmetic unit 22. As each is computed it is sent to the addressed antennule and stored there while the phase shifts for the rest of the antennules are being computed. Conceivably, the phase shifts could be initially stored in a central store and then distributed to the antennules after all the computations had been made. This has the disadvantage, however, that wider bandwidth data lines and drivers are needed for a given antenna scan rate than is required when the phase shifts are sent to the antennules individually.

After being computed, the phase shift information is sent to the antennule by way of a serial data and address lines 26 and 27. All the antennules are attached to line 29 which is connected to lines 26 and 27 by means of fan-out and drivers 28. In addition to the phase shift information these lines also carry, in serial form, the address of the antennule for which the data is intended. Appropriate circuitry is provided in the antennule to recognize when the data on line 29 is intended for it. A single data and address line is used instead of a plurality in order to reduce the number of signal leads going to each antennule.

Another signal lead going to each antennule is the control pulses line 30 of FIG. 3. It carries timing and control signals from control unit 19 to the antennule. The signals received control and direct the signals appearing on data and address line 29.

The relationship between the signals on data and address line 29 and control pulses line 30 and some possible waveforms are shown in FIG. 6. The signals appearing on control pulses line 30 are used to command such control functions as reset, shift and address transfer. Since it is not desirable to use separate lines for each separate command because of the large number of antennules used in an array, all the signals are put on a single line and identifying characteristics such as differences in amplitude and/or spacing are employed to separate them. This method of signal transmission is commonly known in the art as multiplexing. For example, the shift pulses 93 and 95 which are used to shift incoming data on data and address line 29 into the shift register 35 have one-half the amplitude of reset pulses 91. The reset signal 91 consists of three full amplitude pulses while address transfer signal 94 consists of two pulses. Reset and gain transfer signal 92 and reset and polarization transfer signal 96 have a different polarity than the other signals. These are only a few of the possible characteristics that might be used to identify and separate the various control signals coming over the control pulses line.

The antennule address and phase shift data appear in sequence on the data and address line 29. Normally, address data 101 of FIG. 6b which contains as many bits as is required to individually address all the antennules in the array follows, in time, the reset signal on control pulses line 30. The particular antennule that is addressed will then admit phase shift data 102 that follows address bits 101. The format of the data bits may be return to zero or not return to zero, at the designers discretion. They are shown as not return to zero in FIG. 6b since this requires less bandwidth and would therefore be preferrable in this embodiment.

Referring now to FIG. 3 and the right-hand side of the dashed-line labeled antennule which illustrates the antennule section of the phased array beam-steering control system, the address data appearing on the data and address line 29 is shifted into antennule address shift register 36 if the address corresponds to that of the particular antennule to which this shift register belongs. Antennule address shift register 36 upon being addressed will put out a received data signal which opens a gate in the input of the receiving serial register 35. This allows the phase shift data that follows the address data to be entered into receiving serial register 35 where it is stored until all the antennule receiving serial registers in the array have been loaded. When all the registers have been loaded with phase shift information, a special address transfer command is sent to all the antennules. Upon receiving it all the antennule address shift registers, such as 36, put out a transfer signal over line 48 which transfers the phase shift data in the receiving shift registers, such as 35, to the antennule phase shift register, such as 38. The phase shift registers, such as 38, drive the phase shifters within each antennule. When this occurs, the antenna beam steps to its new pointing direction.

It is sometimes desirable to vary the radiofrequency gain and/or the polarization of the signal radiated by the antennule aperture. The signals to vary the gain and polarization can be handled over the same signal lines as used for the basic phase shift information, either by adding this to the basic phase shift or by using separate data words that are transmitted at different times than the phase shift data. The latter method which has the advantage of requiring less computation time is illustrated in FIG. 3. This scheme also requires additional control signals such as reset and gain transfer signals 92 and reset and polarization transfer signals 96 which are illustrated in FIG. 6. The command signals, when radiofrequency gain or polarization control is used, originate in digital controller 16 of the radar signal processor and flow to arithmetic unit 22 by way of lines 14 and 21. The signals flow through arithmetic unit 22 and to driver circuit 28 where they are appropriately modified in format before being sent to the antennule.

The right-hand side of the dashed line in FIG. 3 also illustrates the origin of the control pulses on control pulses line 30. Digit controller 15 provides to control circuit 19 mode and synchronizing data by way of lines 18 and 17 from which control circuit 19 determines appropriate timing and control signals. These signals are sent out over line 20 to fan-out and driver circuits 28 which distribute them to all the antennules by means of a control pulse line such as 30.

In some modes of operation it is desired that the antenna beam be a $Csc^2\theta$ variation rather than the normal pencil beam. To obtain this beam a particular pattern of phase shift data has to be given to the antennule array above that required to point the antenna beam. This data is stored in $Csc^2\theta$ beam phase shift store 23 and is a factor determining the phase shift data computed for each antennule in arithmetic unit 22.

If the antenna aperture is not gimbal roll stabilized, the monopulse angle error created by aperture roll must be compensated by a monopulse error signal 16 which is introduced into digital controller 15. This monopulse error signal is calculated within the radar signal processor as explained in conjunction with the description of FIG. 2.

FIGS. 4 and 5 show in detailed block diagram form a possible way of implementing the functions performed in the antennule as shown in FIG. 3.

FIG. 5 shows a scheme for separating out the various controls signals that appear on control pulse line 30 and corresponds to control pulse discriminator 37 of FIG. 3. The first step in the process is separating the positive control pulses from the negative ones. This is accomplished by polarity sensing and shaping circuits 50. Following the path of negative pulses 92 and 96, shown in FIG. 6a, first, the first negative pulse to occur fires one-shot 51 whose output (on the negative going edge) sets flip-flop 53. The first occurring negative pulse is also applied to the trigger input of flip-flop 53 but is overridden by the output of one shot 51. The succeeding input negative pulses trigger flip-flop 53 through two steps if the group contains three pulses or just one step if the group contains only two. Therefore, depending on the number of pulses in the train, the gain transfer gate 54 or polarization transfer gate 55 will be primed by the output of flip-flop 53. The second one-shot 52 is triggered by the trailing edge of the output of the first one shot 51. The output pulse duration of the first one shot 51 is adjusted so that it is longer in duration than either the group of three of two negative pulses triggering flip-flop 53. Consequently, when one shot 52 is fired by the trailing edge on the first pulse, its output pulse is channeled to the gain transfer line 44 or the polarization transfer line 43 in accordance with the state of flip-flop 53. Flip-flop 53, of course, has been set by the number (two or three) of negative pulses in the group.

Returning to the polarity sensing and shaping circuit 50 let us consider the positive-going pulses that appear out of the right-hand side. By passing them through thresholding circuits 57, the full-amplitude pulses containing reset and address transfer signals are separated from the half-amplitude shift pulses. However, mixed in with these shift pulses are the bases of the double-amplitude pulses which must be separated out. This is accomplished by using and gate 63 in conjunction with the output of one shot 58. Shown to the right of thresholding circuit 57, the output of one-shot 58 is adjusted to be equal to or slightly better than the duration of the sets of reset or address transfer pulses. By using this output to inhibit and gate 63, only those pulses which correspond to the original shift pulses get through the gate, and are so indicated on output line 45.

To distinguish between the groups of two or three positive pulses, the same logical operation as was used for the negative-going pulses is used. This is seen by glancing at the right-hand side of FIG. 5. Gates 61 and 62 in conjunction with flip-flop 64, one shot 59 and one-shot 58 perform the same functions as one-shot 51 in conjunction with one-shot 52, flip-flop 53 in conjunction with gates 54 and 55, in distinguishing between the groups containing two or three positive pulses.

The various control pulses generated by the logic circuitry of FIG. 5 are used to control the shift register transfer gate and stores in FIG. 4. The latter are used to receive and hold the incoming address and phase shift data appearing on data and address line 29. Address bits appearing on data and address line 29 are shifted serially into the address serial register 65 by phase shift command pulse generated by the circuitry of FIG. 5 at output line 45. Phase shift register 65 is shown as having a bit storage length of six bits for illustrative purposes only, for it can actually be any length that is required. These same address bits do not enter receiving serial register 76 because receive gate 75 is normally closed. Address decode gate 67 which is attached to address serial register 65 senses when the received address is that of the particular antennule. When it is, flip-flop 70 is set causing receive gate 75 to open the path to receiving serial registers 76. This allows the data bits which follow the address bits on the data and address line 29 to enter the receiving serial register 76. Had the particular antennule not been addressed, receive gate 75 as well as shift pulses gate 74 would have remained closed and the receiving serial register 76 would have been undisturbed.

It is therefore obvious that by this scheme data may be sequentially sent to all the antennules in an array. The data is held in a receiving serial register 76 until transferred to the appropriate store, such as transmit phase shift register 79, receive phase shift register 80, gain control register 86, or polarization register 87, by the transfer pulses generated in the control pulses discriminator of FIG. 5, or by the phase shift transfer pulse generated from the address serial register 65. The phase shift transfer pulse is generated when address serial register 65 receives a step decode word which is recognized by all the antennules which have a step decode gate 66. Thus, the transfer of phase shift data within the antennule is basically under remote control.

Separate transmit phase shift and received phase shift registers are shown in FIG. 4 because in some applications different phase shifts are desired when transmitting energy then when receiving it. In certain applications when this is not desired nor necessary, only one phase shift store register need be provided.

Obviously many modifications and variations of the present invention are possible in the light of the above teachings.

What is claimed is:

1. A phase shift beam-steering control system for an antenna array comprising:
   an array of antenna elements;
   a plurality of phase shifter means equal in number to said antenna elements and connected to a corresponding antenna element for causing a phase shift in signals applied to said array;
   antenna control means connected to said phase shifter means for controlling the sequence and distribution of phase shift data to individual phase shifter means;
   an arithmetic unit connected to said control means and responsive to beam-steering input data, which comprises beam-pointing data and alignment data, for calculating beam phase shift data for each antenna in said array and delivering it to said antenna control means;
   an alignment store connected to said arithmetic unit for delivering alignment data to said arithmetic unit;
   said alignment data includes for each antenna element (a) its coordinates in said array and (b) phase shift compensation data; and
   a system controller means connected to said arithmetic unit for delivering beam-pointing data to said arithmetic unit.

2. The phase shift beam-steering control system of claim 1 wherein said arithmetic unit is further responsive to roll, pitch, and yaw data for said array, said arithmetic unit taking such data into consideration in calculating beam phase shift data.

3. The phase shift beam-steering control system of claim 1 further comprising a beam pattern data store connected to said arithmetic unit for supplying said arithmetic unit with beam pattern data; and
   wherein said arithmetic unit is further responsive to beam pattern data when calculating beam phase shift data; and
   wherein said antenna array is a planar antenna array.

4. The phase shift beam-steering control system of claim 1 wherein said system controller means delivers beam-pointing data in a predetermined order to said arithmetic unit causing it to calculate and deliver phase shift data to said antenna control means that instructs said antenna control means to provide a scanning pattern for the beam generated by said array.

5. The phase shift beam-steering control system of claim 1 wherein said arithmetic unit calculates the beam phase shift data for each individual antenna element and prefixes such data with an identifying address; and
   wherein said antenna control means comprises logic circuitry individual to each active element responsive to its identifying address to process the beam phase shift data transmitted by said arithmetic unit.

6. The phase shift beam-steering control system of claim 5 wherein said alignment store delivers predetermined alignment data to said arithmetic unit for each individual antenna element, the alignment data being prefixed by the appropriate active antenna element address.

7. The phase shift beam-steering control system of claim 6 wherein said alignment store provides alignment data for the receive mode of system operation and for the transmit mode of system operation, if the two modes require different alignment data for each antenna element.

* * * * *